(12) United States Patent
Qiu et al.

(10) Patent No.: US 11,979,030 B2
(45) Date of Patent: May 7, 2024

(54) SHARED POWER CONVERTER FOR A WIRELESS TRANSMITTER DEVICE

(71) Applicant: Apple Inc., Cupertino, CA (US)

(72) Inventors: Weihong Qiu, San Ramon, CA (US); Zaki Moussaoui, San Carlos, CA (US); Rohan Dayal, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 567 days.

(21) Appl. No.: 16/983,866

(22) Filed: Aug. 3, 2020

(65) Prior Publication Data

US 2021/0021158 A1 Jan. 21, 2021

Related U.S. Application Data

(63) Continuation of application No. 15/422,345, filed on Feb. 1, 2017, now Pat. No. 10,734,840.

(60) Provisional application No. 62/380,337, filed on Aug. 26, 2016.

(51) Int. Cl.
*H02J 50/12* (2016.01)
*H02J 50/40* (2016.01)

(52) U.S. Cl.
CPC ............ *H02J 50/12* (2016.02); *H02J 50/402* (2020.01)

(58) Field of Classification Search
CPC ...... H02J 50/12; H02J 50/402; H02M 1/0067; H02M 1/007; H02M 1/0074; H02M 1/0077; H02M 1/008
See application file for complete search history.

(56) References Cited

U.S. PATENT DOCUMENTS

| | | |
|---|---|---|
| 3,502,809 A | 3/1970 | Dickey |
| 4,785,136 A | 11/1988 | Mollet |
| 4,871,220 A | 10/1989 | Kohin |
| 5,373,102 A | 12/1994 | Ehrlich et al. |
| 5,384,575 A | 1/1995 | Wu |
| 5,496,966 A | 3/1996 | Hightower et al. |

(Continued)

FOREIGN PATENT DOCUMENTS

| | | |
|---|---|---|
| CN | 101202277 | 6/2008 |
| CN | 101447683 | 6/2009 |

(Continued)

*Primary Examiner* — Elim Ortiz
(74) *Attorney, Agent, or Firm* — Brownstein Hyatt Farber Schreck, LLP

(57) ABSTRACT

A transmitter device is configured to transfer energy to multiple receiver devices. The transmitter device includes multiple transmitter coils, and a shared power converter is coupled to each transmitter coil. The shared power converter includes a leading half bridge and multiple trailing half bridges. Each transmitter coil is coupled between the leading half bridge and a respective one of the trailing half bridges. The shared power converter is dynamically configurable in that the leading half bridge may be coupled to multiple trailing half bridges when energy is to be transferred wirelessly to two or more receiver devices. The leading half bridge simultaneously operates with each trailing half bridge as an independent full-bridge phase shift inverter. A signal supplied to each transmitter coil is independently regulated by controlling a phase shift of a respective trailing half bridge with respect to the leading half bridge.

14 Claims, 8 Drawing Sheets

(56) References Cited

U.S. PATENT DOCUMENTS

| | | |
|---|---|---|
| 5,545,844 A | 8/1996 | Plummer, III |
| 5,563,614 A | 10/1996 | Alden |
| 5,760,584 A | 6/1998 | Frederick |
| 6,144,512 A | 11/2000 | Eden |
| 6,269,247 B1 | 7/2001 | Chiodini |
| 6,449,181 B1 | 9/2002 | Rieger et al. |
| 6,492,587 B1 | 12/2002 | Yoshinaga |
| 6,724,950 B2 | 4/2004 | Byrne |
| 6,768,051 B2 | 7/2004 | Wiltshire |
| 6,864,419 B2 | 3/2005 | Lovens |
| 6,927,574 B2 | 8/2005 | Young |
| 7,035,087 B2 | 4/2006 | Tan |
| 7,068,140 B2 | 6/2006 | Chou |
| 7,170,363 B2 | 1/2007 | Wiltshire |
| 7,466,077 B2 | 12/2008 | Joo et al. |
| 7,639,206 B2 | 12/2009 | Behdad |
| 7,679,205 B1 | 3/2010 | Burns |
| 7,705,591 B2 | 4/2010 | Geren et al. |
| 7,732,038 B2 | 6/2010 | Naito et al. |
| 7,737,370 B2 | 6/2010 | Aoyama et al. |
| 7,791,311 B2 | 9/2010 | Sagoo |
| 7,906,936 B2 | 3/2011 | Azancot et al. |
| 7,948,208 B2 | 5/2011 | Partovi et al. |
| 7,948,781 B2 | 5/2011 | Esaka et al. |
| 7,952,322 B2 | 5/2011 | Partovi et al. |
| 8,013,568 B2 | 9/2011 | Park et al. |
| 8,050,063 B2 | 11/2011 | Wagoner et al. |
| 8,101,931 B2 | 1/2012 | Blandford, III |
| 8,115,448 B2 | 2/2012 | John |
| 8,169,185 B2 | 5/2012 | Partovi et al. |
| 8,193,769 B2 | 6/2012 | Azancot et al. |
| 8,262,244 B2 | 9/2012 | Metcalf |
| 8,338,990 B2 | 12/2012 | Baarman et al. |
| 8,421,274 B2 | 4/2013 | Sun et al. |
| 8,436,317 B1 | 5/2013 | Chen |
| 8,531,153 B2 | 9/2013 | Baarman et al. |
| 8,587,154 B2 | 11/2013 | Fells et al. |
| 8,629,652 B2 | 1/2014 | Partovi et al. |
| 8,629,654 B2 | 1/2014 | Partovi et al. |
| 8,723,053 B2 | 5/2014 | Winch |
| 8,729,734 B2 | 5/2014 | Widmer et al. |
| 8,760,113 B2 | 6/2014 | Keating et al. |
| 8,779,745 B2 | 7/2014 | Brown |
| 8,810,196 B2 | 8/2014 | Ettes et al. |
| 8,836,276 B2 | 9/2014 | Prescott |
| 8,838,022 B2 | 9/2014 | Dobyns |
| 8,890,470 B2 | 11/2014 | Partovi |
| 8,896,264 B2 | 11/2014 | Partovi |
| 8,901,881 B2 | 12/2014 | Partovi |
| 8,928,284 B2 | 1/2015 | Carobolante |
| 8,947,047 B2 | 2/2015 | Partovi et al. |
| 8,947,892 B1 | 2/2015 | Lam |
| 9,001,031 B2 | 4/2015 | Lo et al. |
| 9,024,576 B2 | 5/2015 | Maenpaa |
| 9,025,143 B2 | 5/2015 | Hahn |
| 9,041,152 B2 | 5/2015 | Luo et al. |
| 9,065,423 B2 | 6/2015 | Ganem et al. |
| 9,071,062 B2 | 6/2015 | Whitehead |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,118,203 B2 | 8/2015 | Davis |
| 9,124,126 B2 | 9/2015 | Ichikawa |
| 9,153,998 B2 | 10/2015 | Mayo |
| 9,161,484 B2 | 10/2015 | Baarman et al. |
| 9,171,555 B2 | 10/2015 | Meloche |
| 9,177,716 B2 | 11/2015 | Goto |
| 9,178,369 B2 | 11/2015 | Partovi |
| 9,209,627 B2 | 12/2015 | Baarman et al. |
| 9,217,323 B2 | 12/2015 | Clark |
| 9,276,437 B2 | 3/2016 | Partovi et al. |
| 9,281,759 B2 | 3/2016 | Lee et al. |
| 9,300,147 B2 | 3/2016 | Lee et al. |
| 9,356,659 B2 | 5/2016 | Partovi |
| 9,461,501 B2 | 10/2016 | Partovi et al. |
| 9,496,732 B2 | 11/2016 | Partovi |
| 9,497,894 B1 | 11/2016 | Ramsey |
| 9,548,158 B2 | 1/2017 | Groves et al. |
| 9,577,440 B2 | 2/2017 | Partovi et al. |
| 9,577,460 B2 | 2/2017 | Park |
| 9,620,983 B2 | 4/2017 | Abdelmoneum et al. |
| 9,625,545 B2 | 4/2017 | Dumoulin et al. |
| 9,643,507 B2 | 5/2017 | Scarlatti et al. |
| 9,698,467 B2 | 7/2017 | Mitchell |
| 9,711,272 B2 | 7/2017 | Hassan-Ali et al. |
| 9,722,447 B2 | 8/2017 | Partovi |
| 9,726,518 B2 | 8/2017 | Widmer et al. |
| 9,735,628 B2 | 8/2017 | Efe et al. |
| 9,748,326 B2 | 8/2017 | Yen et al. |
| 9,762,083 B2 | 9/2017 | Nam et al. |
| 9,793,721 B2 | 10/2017 | Partovi et al. |
| 9,831,686 B2 | 11/2017 | Kohara et al. |
| 9,837,846 B2 | 12/2017 | Partovi |
| 9,841,956 B2 | 12/2017 | Bornheimer et al. |
| 9,859,079 B2 | 1/2018 | Jarrahi et al. |
| 9,862,282 B2 | 1/2018 | Boser et al. |
| 9,893,553 B2 | 2/2018 | Pudipeddi et al. |
| 9,905,360 B2 | 2/2018 | Muntean et al. |
| 9,912,197 B2 | 3/2018 | Riehl |
| 9,917,479 B2 | 3/2018 | Bronson et al. |
| 10,008,881 B2 | 6/2018 | Lee et al. |
| 10,027,150 B2 | 7/2018 | Kvols |
| 10,044,232 B2 | 8/2018 | Crosby et al. |
| 10,079,090 B2 | 9/2018 | Teggatz et al. |
| 10,090,709 B2 | 10/2018 | Matsumoto et al. |
| 10,135,303 B2 | 11/2018 | Moyer et al. |
| 10,141,785 B2 | 11/2018 | Son et al. |
| 10,158,244 B2 | 12/2018 | Pinciuc et al. |
| 10,256,666 B2 | 4/2019 | Jung et al. |
| 10,270,293 B2 | 4/2019 | Lenive |
| 10,277,442 B2 | 4/2019 | Kim et al. |
| 10,439,435 B2 | 10/2019 | Staring et al. |
| 10,477,741 B1 | 11/2019 | Bae et al. |
| 10,523,276 B2 | 12/2019 | Stone et al. |
| 10,581,284 B2 | 3/2020 | Khripkov et al. |
| 10,594,160 B2 | 3/2020 | Jain et al. |
| 10,651,685 B1 | 5/2020 | Herbst et al. |
| 10,734,840 B2 | 8/2020 | Qiu et al. |
| 10,790,699 B2 | 9/2020 | Pinciuc et al. |
| 11,316,371 B1* | 4/2022 | Partovi ............ H02J 50/12 |
| 2002/0137473 A1 | 9/2002 | Jenkins |
| 2004/0021376 A1 | 2/2004 | Beulich |
| 2008/0067914 A1 | 3/2008 | Kim et al. |
| 2008/0258679 A1* | 10/2008 | Manico ............ G06F 1/1632 |
| | | 320/106 |
| 2009/0052721 A1 | 2/2009 | Dabrowski |
| 2010/0015918 A1 | 1/2010 | Liu et al. |
| 2011/0050164 A1 | 3/2011 | Partovi et al. |
| 2011/0164471 A1 | 7/2011 | Baarman |
| 2011/0169770 A1 | 7/2011 | Mishina et al. |
| 2011/0211380 A1* | 9/2011 | Brown ............ H02M 3/33569 |
| | | 363/131 |
| 2012/0104997 A1 | 5/2012 | Carobolante |
| 2013/0093388 A1 | 4/2013 | Partovi |
| 2013/0119929 A1 | 5/2013 | Partovi |
| 2013/0260677 A1 | 10/2013 | Partovi |
| 2013/0271069 A1 | 10/2013 | Partovi |
| 2013/0285605 A1 | 10/2013 | Partovi |
| 2013/0300204 A1 | 11/2013 | Partovi |
| 2014/0191568 A1 | 7/2014 | Partovi |
| 2015/0130412 A1 | 5/2015 | Partovi |
| 2015/0303707 A1 | 10/2015 | McCauley et al. |
| 2016/0064137 A1 | 3/2016 | Perez et al. |
| 2016/0181853 A1 | 6/2016 | Yang et al. |
| 2016/0284465 A1 | 9/2016 | Maniktala |
| 2017/0092409 A1 | 3/2017 | Graham |
| 2017/0279305 A1* | 9/2017 | Staring ............ H02J 50/10 |
| 2017/0353046 A1 | 12/2017 | Chen et al. |
| 2018/0226822 A1 | 8/2018 | Seo et al. |
| 2018/0343042 A1 | 11/2018 | Luzinski et al. |

(56) References Cited

U.S. PATENT DOCUMENTS

2019/0058348 A1    2/2019   Wang et al.
2021/0021158 A1    1/2021   Qiu et al.

FOREIGN PATENT DOCUMENTS

| CN | 103168405 | 6/2013 |
| CN | 103248131 | 8/2013 |
| CN | 103972993 | 8/2014 |
| CN | 104347259 | 2/2015 |
| EP | 2211438 | 7/2010 |
| EP | 2256895 | 12/2010 |
| JP | 5510608 | 6/2014 |
| KR | 20080081480 | 9/2008 |
| WO | WO 2008/032746 | 3/2008 |
| WO | WO2009/081126 | 7/2009 |

* cited by examiner

SHARED POWER CONVERTER FOR A WIRELESS TRANSMITTER DEVICE

CROSS-REFERENCE TO RELATED APPLICATION(S)

This application is a continuation patent application of U.S. patent application Ser. No. 15/422,345, filed Feb. 1, 2017 and titled "Shared Power Converter for a Wireless Transmitter Device," which is a nonprovisional patent application of and claims the benefit of U.S. Provisional Patent Application No. 62/380,337, filed on Aug. 26, 2016 and entitled "A Shared Power Converter For A Wireless Transmitter Device," the disclosures of which are hereby incorporated herein by reference in their entireties.

FIELD

The described embodiments relate generally to wireless energy transfer systems. More particularly, the present embodiments relate to a wireless transmitter device with a shared power converter for use with multiple transmitter coils.

BACKGROUND

Some electronic devices are configured to receive power wirelessly. A user may place the electronic device on a charging surface of a wireless charging device to transfer power from the charging device to the electronic device. The charging device transfers power to the electronic device through inductively coupling between a transmitter coil in the charging device and a receiver coil in the electronic device.

Some wireless charging devices are constructed to only transfer energy to a particular electronic device. This can increase the cost to a user who uses wireless charging for multiple electronic devices. Because each electronic device may operate only with a particular charging device, a user may be required to purchase multiple charging devices.

SUMMARY

Embodiments described herein relate to a transmitter device that is configured to transfer energy to multiple receiver devices using a shared power converter. The shared power converter includes a single leading half bridge and multiple trailing half bridges. The shared power converter can be coupled to multiple transmitter coils, with each transmitter coil coupled between the single leading half bridge and a respective one of the multiple trailing half bridges. The shared power converter is dynamically configurable in that the leading half bridge may be coupled to one or more of the multiple trailing half bridges when energy is to be transferred wirelessly to a single receiver device, or the leading half bridge may be simultaneously coupled to multiple trailing half bridges when energy is to be transferred wirelessly to multiple receiver devices. When the leading half bridge is coupled to a respective trailing half bridge, the leading half bridge and the respective trailing half bridge form an independent full bridge. The amount of energy that is transferred by the transmitter coil coupled between the leading half bridge and the respective trailing half bridge can be regulated by controlling a relative phase offset or difference between the switch signals that are received by the respective trailing half bridge and the switch signals that are received by the leading half bridge.

In one aspect, a shared power converter circuit for a wireless energy transfer system includes a leading half bridge coupled between first and second input nodes of the shared power converter circuit and multiple trailing half bridges coupled between the first and second input nodes of the shared power converter circuit. The leading half bridge has a first intermediate node that is coupled to multiple transmitter coils. Each trailing half bridge has a second intermediate node that is coupled to a respective one of the multiple transmitter coils. The leading half bridge is configured to simultaneously operate with each trailing half bridge as an independent full bridge phase shift inverter. An alternating current (AC) signal (e.g., AC voltage) supplied to each transmitter coil is independently regulated by controlling a phase shift of a respective trailing half bridge with respect to the leading half bridge.

In another aspect, a wireless transmitter device includes a first transmitter coil, a second transmitter coil, a shared power converter coupled to the first and second transmitter coils, and a processing device coupled to the shared power converter. The shared power converter further includes a leading half bridge, a first trailing half bridge, and a second trailing half bridge. The leading half bridge includes a first switching element coupled to a first intermediate node and a second switching element coupled to the first intermediate node. The first trailing half bridge includes a third switching element coupled to a second intermediate node and a fourth switching element coupled to the second intermediate node. The second trailing half bridge includes a fifth switching element connected to a third intermediate node and a sixth switching element connected to the third intermediate node. The first transmitter coil is coupled between the first and second intermediate nodes, and the second transmitter coil is coupled between the first and third intermediate nodes. The processing device is configured to assemble the shared power converter into a full bridge for wireless energy transfer from the first transmitter coil. The processing device is configured to cause first and second switch signals to be transmitted to the leading half bridge, and to cause third and fourth switch signals to be transmitted to the first trailing half bridge. The first and second switch signals have a first phase and the third and fourth switch signals have a second phase that is different from the first phase.

In yet another aspect, a shared power converter is included in, or coupled to, a wireless transmitter device. The shared power converter can include a leading half bridge and first and second trailing half bridges. A first transmitter coil is coupled between the leading half bridge and the first trailing half bridge. A second transmitter coil is coupled between the leading half bridge and the second trailing half bridge. A method of operating the wireless transmitter device may include detecting a first receiver device on a transmitting surface of the transmitter device and forming a first full bridge in the shared power converter to transfer energy from the first transmitter coil to the first receiver device. The first full bridge is formed by transmitting a first set of switch signals to the leading half bridge, and transmitting a second set of switch signals to the first trailing half bridge. The second set of switch signals is phase-shifted with respect to the first set of switch signals. Additionally, a second receiver device may be detected on the transmitting surface of the transmitter device and a second full bridge formed in the shared power converter to transfer energy from the second transmitter coil to the second receiver device. The second full bridge is formed by transmitting a third set of switch signals to the second trailing half bridge, where the third set of switch signals is phase-shifted with respect to the first set of switch signals. In some embodiments, the third set of switch signals is phase-shifted with respect to the first set of switch signals and with respect to the second set of switch signals. The first and second full bridges can be formed sequentially or simultaneously (either at the same time or with some overlap in time).

In another aspect, a shared power converter is included in, or coupled to, a wireless transmitter device. The shared power converter includes a leading half bridge and multiple trailing half bridges. A transmitter coil is coupled between the leading half bridge and each respective one of the multiple trailing half bridges. A method of operating the wireless transmitter device includes detecting a receiver device on a transmitting surface of the transmitter device and forming a full bridge in the shared power converter to transfer energy from a respective transmitter coil to the receiver device. The operation of forming the full bridge includes transmitting a first set of switch signals to the leading half bridge, and transmitting a second set of switch signals to a respective trailing half bridge that is coupled to the respective transmitter coil. The second set of switch signals is phase-shifted with respect to the first set of switch signals.

In yet another aspect, a power adapter includes a leading half bridge coupled between first and second input nodes, a first trailing half bridge coupled between the first and the second input nodes, and a second trailing half bridge coupled between the first and the second input nodes the leading half bridge. The leading half bridge includes a first switching element coupled between the first input node and a first intermediate node, and a second switching element coupled between the first intermediate node and the second input node. The first trailing half bridge includes a third switching element coupled between the first input node and a second intermediate node, and a fourth switching element coupled between the second intermediate node and the second input node. The second trailing half bridge includes a fifth switching element coupled between the first input node a third intermediate node, and a sixth switching element coupled between the third intermediate node and the second input node. A first load is coupled between the first intermediate node and the second intermediate node and a second load is coupled between the first intermediate node and the third intermediate node.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
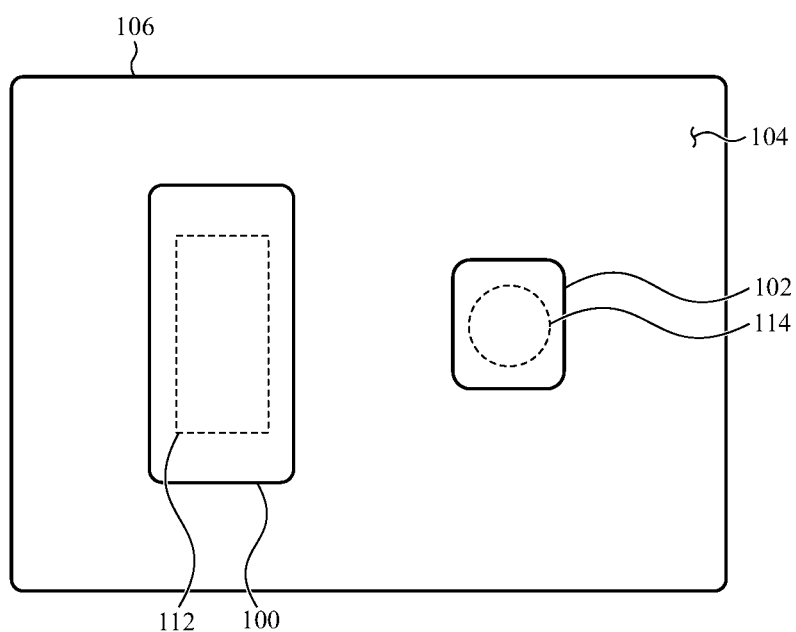
FIG. 1 shows an example transmitter device that is configured to transfer energy wirelessly to one or more receiver devices.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a shared power converter that is configurable to convert an input signal into multiple alternating current (AC) signals that are used by one or more components in receiver devices. For example, the shared power converter may be used to convert a direct current (DC) signal into an AC signal or to convert a first AC signal into a second AC signal. In one embodiment, the shared power converter may be included in a wireless transmitter device. In another embodiment, the shared power converter can be included in a power adapter that couples a wireless transmitter device to a power source, such as a wall outlet.

In the embodiments described herein, the shared power converter is coupled to, or included in, an inductive or resonant wireless transmitter device that is configured to transfer energy to multiple receiver devices. The wireless transmitter device includes multiple transmitter coils, with at least one transmitter coil associated with each receiver device. In some embodiments, each receiver device is associated with a respective one of the transmitter coils when energy is transferred to multiple receiver devices.

The shared power converter is coupled to each transmitter coil. The shared power converter includes a leading half bridge and multiple trailing half bridges. Each transmitter coil is coupled between the leading half bridge and a respective one of the multiple trailing half bridges. The shared power converter is dynamically configurable in that the leading half bridge may be coupled to select trailing half bridges when energy is to be transferred wirelessly to multiple receiver devices. For example, the transmitter device can transfer energy wirelessly to two receiver devices by selectively activating two individual transmitter coils. Each transmitter coil is selectively enabled by configuring the shared power converter into two full bridges, e.g., by coupling the leading half bridge with two respective trailing half bridges. Energy can be transferred to the two receiver devices sequentially, simultaneously, or with some overlap in time.

In a particular embodiment, the leading half bridge includes two switching elements or semiconductor switches that are each connected to a first node. Each trailing half bridge also includes two switching elements or semiconductor switches that are each connected to a distinct second node. A transmitter coil is coupled between the first node in the leading half bridge and the second node in a respective trailing half bridge. In a non-limiting embodiment, each switching element is a metal-oxide semiconductor field-effect transistor. Other embodiments can use a different type of switching element, such as, for example, a bi-polar transistor, a diode, or any other suitable electronic switch.

In some embodiments, a processing device is coupled to the shared power converter. The processing device is adapted to cause switch signals to be received by the leading half bridge and to cause switch signals to be received by one or more trailing half bridges. A full bridge is created when the primary half bridge is coupled to a trailing half bridge. Thus, the shared power converter can be assembled and reassembled to produce one or more full bridges for wireless energy transfer.

In some embodiments, the switch signals that are received by the leading half bridge and the switch signals that are received by the trailing half bridges are used to select which trailing bridges are coupled to the leading half bridge to create a full bridge. In other words, the switch signals are used to configure and reconfigure the shared power converter for wireless energy transfer. Which trailing half bridge is coupled to the leading half bridge can be determined based at least in part on the characteristics of the transmitter coil coupled to a trailing half bridge. Characteristics of a transmitter coil include, but are not limited to, the number of windings, the DC resistance, the maximum DC signal, the electromagnetic interference, the magnetic saturation flux density, the Curie temperature, and so on.

In some embodiments, a switch can be coupled between the leading half bridge and each trailing half bridge. The shared power converter is configured into one or more full bridges by closing one or more respective switches to couple the leading half bridge to respective trailing half bridges.

For example, in one embodiment, a full H Bridge is produced when the leading half bridge is coupled to a trailing half bridge. The H Bridge is used to produce a coil signal (e.g., a current) that passes through a transmitter coil bi-directionally (e.g., an AC coil signal). The AC coil signal generates one or more time-varying magnetic fields around the transmitter coil. Energy is transferred to receiver device when the time-varying magnetic field(s) extend to, and interact with, a receiver coil in the receiver device. The time-varying magnetic field(s) induce an alternating voltage across the receiver coil, which in turn produces an AC signal in the receiver coil. The AC signal in the receiver coil can be used for various operations or functions, such as to charge a battery and/or to transmit and/or receive communication or control signals.

In some embodiments, the processing device is coupled to a signal generator. The signal generator is configured to produce the switch signals for the leading and trailing half bridges. In a non-limiting example, the processing device may access one or more switch signal characteristics that are stored in a memory. The processing device can cause the switch signal characteristic(s) to be transmitted to the signal generator to cause the signal generator to produce at least one switch signal that includes the received at least one switch signal characteristic. Example switch signal characteristics include, but are not limited to, a frequency or a frequency difference, an amplitude or an amplitude difference, and/or a phase or a phase difference. The generated switch signals are then received by the leading half bridge and at least one trailing half bridge to create a full bridge for wireless energy transfer.

The switch signal characteristic(s) can be determined based at least in part on the characteristics of a respective transmitter coil (e.g., number of windings, DC resistance, maximum DC signal, the electromagnetic interference, magnetic saturation flux density, Curie temperature, and the like). Additionally or alternatively, the one or more switch signal characteristics can be determined based at least in part on the characteristics of the receiver coil in the receiver device and/or the energy transfer specifications for the receiver device.

Additionally or alternatively, the processing device can access a memory to cause switch signals that are stored in the memory to be transmitted to the leading half bridge and/or one or more respective trailing half bridges. The switch signals received by the leading half bridge and by at least one particular trailing half bridge create a full bridge for wireless energy transfer.

The reconfigurable shared power converter reduces the number of components in a transmitter device, which may reduce the complexity and the cost of a transmitter device. Conventional wireless transmitter devices couple a power converter to each transmitter coil, which increases the number of components in the transmitter device. In contrast to a conventional transmitter device, a shared power converter can be coupled simultaneously to two or more transmitter coils to transfer energy from each transmitter coil. Thus, the shared power converter reduces the number of components in a transmitter device. In many examples, fewer components translate into reduced complexity and cost.

Additionally, the shared power converter allows the transfer of energy to each receiver device to be defined or customized for each receiver device. The switch signal characteristics of the switch signals that are received by a respective trailing half bridge can be modified or controlled with respect to the switch signals that are received by the leading half bridge. For example, the switch signals received by a trailing half bridge may be phase-shifted with respect to the switch signals that are received by the leading half bridge. Additionally, the amplitudes and/or frequencies of the switch signals that are received by the trailing half bridge can differ from the amplitudes and/or frequencies of the switch signals that are received by the leading half bridge. When two or more trailing half bridges are coupled to the leading half bridge, the switch signals received by each trailing half bridge can have a different phase, amplitude, and/or frequency with respect to the phase, amplitude, and/or frequency of the switch signals received by the leading half bridge. Through constructive and destructive interferences, a unique or individualized AC coil signal may be received by a transmitter coil, allowing the transfer of energy to be regulated and customized for each receiver device.

As used herein, the terms "connected" and "coupled" are generally intended to be construed broadly to cover direct connections and indirect connections. In the context of the present invention, the terms "connected" and "coupled" are intended to cover circuits, components, and/or devices that are connected such that an electrical parameter passes from one to another. Example electrical parameters include, but are not limited to, voltages, currents, magnetic fields, control signals, and/or communication signals. Thus, the terms "coupled" and "connected" include circuits, components, and/or devices that are coupled directly together or through one or more intermediate circuits, components, and/or devices.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 depicts one example of a transmitter device that is configured to transfer energy wirelessly to one or more receiver devices. In the illustrated embodiment, a first receiver device 100 and a second receiver device 102 are placed on a transmitting surface 104 of a transmitter device 106. The transmitter device 106 is configured to transfer energy wirelessly to the first and second receiver devices 100, 102 sequentially, simultaneously, or partially overlapping in time.

In some embodiments, the transmitter device 106 is configured to convert a DC signal into a first AC signal. The first AC signal is used by the transmitter device 106 to generate one or more time-varying or oscillating magnetic fields that are used to transfer energy wirelessly from one or more transmitter coils (not shown) in the transmitter device 106 to one or more receiver coils 112 in the first receiver device 100 when the first receiver device 100 is placed on or near the transmitting surface 104 of the transmitter device 106.

Additionally, the transmitter device 106 is configured to convert the DC signal into a second AC signal. The second AC signal may be the same signal as the first AC signal or a different signal compared to the first AC signal. The second AC signal is used by the transmitter device 106 to generate one or more time-varying or oscillating magnetic fields that are used to transfer energy wirelessly from one or more transmitter coils (not shown) in the transmitter device 106 to one or more receiver coils 114 in the second receiver device 102 when the second receiver device 102 is placed on or near the transmitting surface 104 of the transmitter device 106.

In some embodiments, the DC-to-AC conversion stage can be omitted from the transmitter device 106. For example, a power adapter (not shown) that couples a wireless transmitter device to a power source, such as a wall outlet, may be configured to convert a first AC signal into a second AC signal. In a non-limiting example, the power converter can convert a high voltage, low frequency AC signal into a low voltage, high frequency AC signal. The low voltage, high frequency AC signal may be received by the transmitter coil(s) to generate one or more time-varying magnetic fields that are used to transfer energy wirelessly from the transmitter coil(s) in the transmitter device 106 to the receiver coil(s) 112, 114 in the first and second receiver devices 100, 102, respectively.

The transmitter device 106 can be implemented as any suitable transmitter device. Example transmitter devices include, but are not limited to, a wireless charging pad, a wireless charging station, clothing or a fashion accessory that is configured to wirelessly charge a receiver device, a wireless charging dock, and a wireless charging cover or door that can be removably attached to the housing of the receiver device (e.g., a wireless charging cover that replaces a battery door).

Similarly, the first and second receiver devices 100, 102 may each be configured as any suitable receiver device. For example, a receiver device may be a cellular or smart phone, a gaming device, a remote control, a tablet or laptop computing device, a digital media player, a wearable electronic device (e.g., a watch), a kitchen or household appliance, a motor vehicle, and so on.

Embodiments described herein relate to a transmitter device that includes multiple transmitter coils for transferring energy to multiple receiver devices. As described earlier, energy can be transferred to two or more receiver devices simultaneously, at different times, or with some overlap in time. The transmitter device is coupled to, or includes, a shared power converter that permits the transmitter device to control and customize the transfer of energy to each receiver device. As will be described in more detail in conjunction with FIG. 3, the shared power converter includes a leading half bridge that can be coupled to at least one trailing half bridge to transfer energy to one or more receiver devices.

Figure 2:
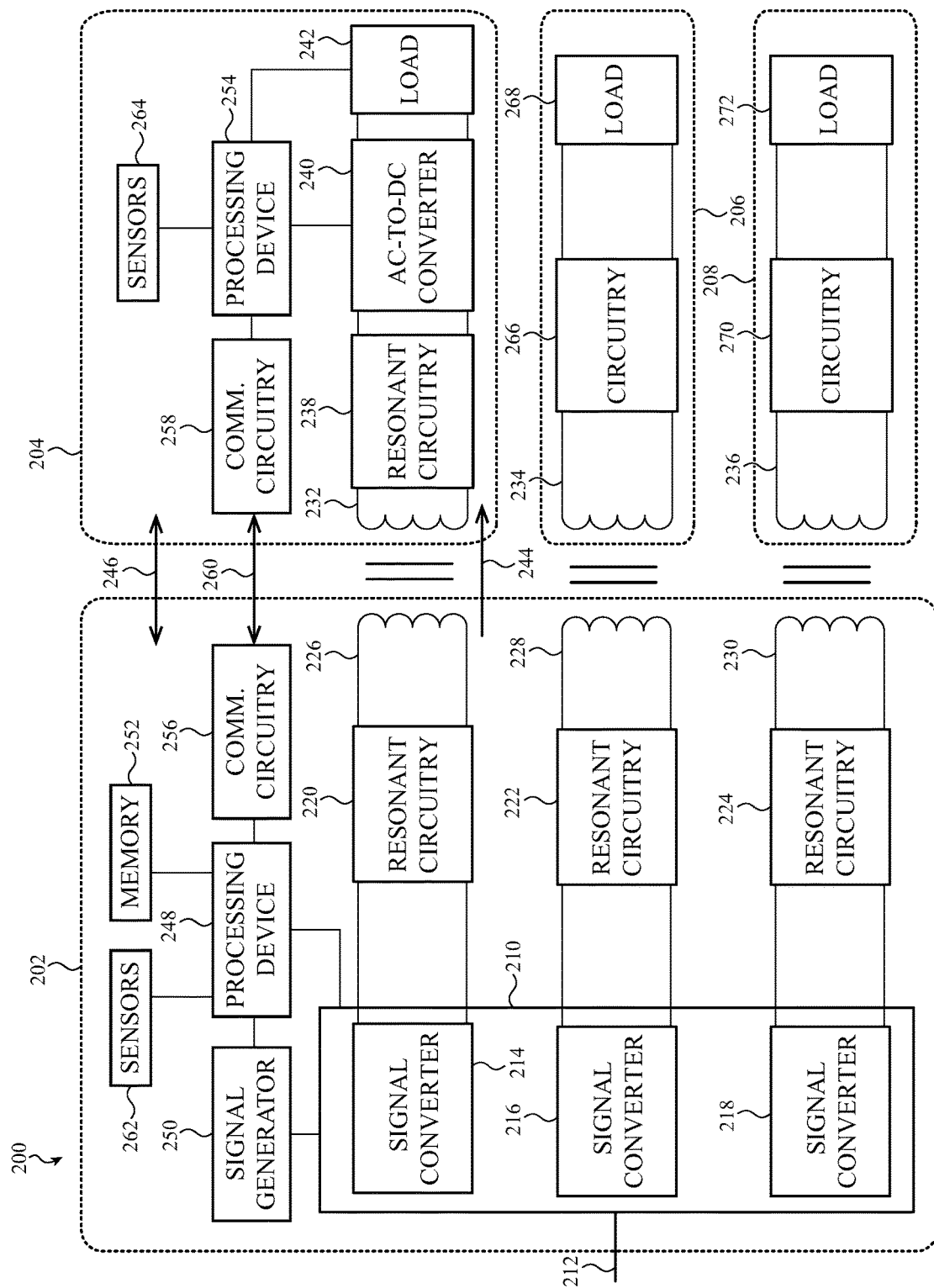
FIG. 2 shows an example wireless energy transfer system.

FIG. 2 shows an example wireless energy transfer system. The system 200 includes a transmitter device 202 and three receiver devices 204, 206, 208. For simplicity, only the receiver device 204 is shown in detail. However, those skilled in the art will recognize that the other receiver devices 206, 208 can be configured similarly to the receiver device 204. Additionally, the receiver devices 204, 206, 208 may each include additional components, circuits, and/or functionality. For example, a receiver device can include a display and/or a touch-sensitive display, network ports, one or more input devices (e.g., trackpad, microphone, button, etc.), and/or one or more output devices (e.g., speakers, haptic device, etc.).

In the illustrated embodiment, a shared power converter 210 in the transmitter device 202 receives a DC signal on a signal line 212. The signal line 212 can represent a power cable that is connected to a power adapter, a connection to a battery, or a connection (e.g., a USB cable) to another electronic device. In other embodiments, the transmitter device 202 may be configured to receive an AC signal by connecting an AC-to-DC power converter between the signal line 212 and the shared power converter 210.

The shared power converter 210 is configurable to inductively couple each transmitter coil 226, 228, 230 in the transmitter device 202 to a respective receiver coil 232, 234, 236 in one or more of the receiver devices 204, 206, 208. In particular, the shared power converter 210 can be assembled into multiple signal converters (e.g., multiple DC-to-AC power converters). In the illustrated embodiment, the shared power converter 210 is configured into three signal converters 214, 216, 218 (e.g., three DC-to-AC power converters). Each signal converter 214, 216, 218 converts a DC signal into an AC coil signal that is used to transfer energy to the receiver devices 204, 206, 208, respectively.

As will be described in more detail later, the switch signals that are received by a signal converter 214, 216, 218 can be used to modify, define, or customize the characteristics of an AC coil signal that is received by a respective transmitter coil 226, 228, 230. The characteristics of the AC coil signal include the phase, the frequency, and/or the amplitude of the AC coil signal. The AC coil signal is used to control and/or adjust the time-varying magnetic field(s) produced by a transmitter coil 226, 228, 230, which in turn regulates and adjusts the amount of energy transferred to a receiver coil 232, 234, 236 in a receiver device 204, 206, 208, respectively.

The signal converters 214, 216, 218 can be any suitable type of a DC-to-AC power converter. In one embodiment, each signal converter 214, 216, 218 is constructed as an H Bridge power converter. An H Bridge power converter includes four switching elements that are selectively activated (e.g., turned on or opened) and deactivated (e.g., turned off or closed) to convert a DC signal into an AC signal. Any suitable switching element can be used. An example shared power converter is described in conjunction with FIG. 3.

The output of each signal converter 214, 216, 218 is coupled to a respective transmitter resonant circuitry 220, 222, 224. Each transmitter resonant circuitry 220, 222, 224 may include one or more electrical components (e.g., resistors, capacitors, inductors) that are used to determine a resonating frequency for the transmitter device 202 when energy is transferred to at least one receiver device 204, 206, 208. The output of each transmitter resonant circuitry 220, 222, 224 is coupled to a respective transmitter coil 226, 228, 230 that is selectively energized with an AC coil signal for energy transfer.

As described earlier, each receiver device 204, 206, 208 includes a receiver coil 232, 234, 236. In FIG. 2, the receiver coil 232 inductively couples with the transmitter coil 226 to transfer energy to the receiver device 204. Similarly, the receiver coil 234 inductively couples with the transmitter coil 228 for energy transfer, and the receiver coil 236 inductively couples with the transmitter coil 230 for energy transfer. Each transmitter coil 226, 228, 230 can have the same or different characteristics (e.g., number of windings, DC resistance, maximum DC signal, the electromagnetic interference, magnetic saturation flux density, Curie temperature, and the like). Similarly, each receiver coil 232, 234, 236 may have the same or different characteristics.

As shown in the receiver device 204, the receiver coil 232 is coupled to receiver resonant circuitry 238. Like the transmitter resonant circuitry, the receiver resonant circuitry 238 can include one or more electrical components (e.g., resistors, capacitors, inductors) that are used to determine a resonating frequency for the receiver device 204 when energy is transferred to the receiver device 204. The transfer of energy from the transmitter device 202 to the receiver device 204 can be more efficient when the transmitter device 202 and the receiver device 204 resonant at a common frequency.

An output of the receiver resonant circuitry 238 is coupled to an AC-to-DC power converter 240. Any suitable type of AC-to-DC power converter may be used. For example, the AC-to-DC power converter 240 can be constructed as a diode bridge in one embodiment.

A load 242 is coupled to the output of the AC-to-DC power converter 240. The load 242 represents a rechargeable battery and/or one or more components that use the energy received from the receiver coil 232.

Energy is transferred from the transmitter coil 226 to the receiver coil 232 by passing an AC coil signal through the transmitter coil 226 to produce one or more time-varying or oscillating magnetic fields (energy transfer represented by arrow 244). Because the AC coil signal is an alternating signal, the direction(s) of the magnetic field(s) changes based on the direction of the AC coil signal through the transmitter coil 226. Energy is transferred to the receiver device 204 when the time-varying magnetic fields extend to, and interact with, the receiver coil 232. The time-varying magnetic fields induce an AC voltage across the receiver coil 232, which in turn produces an AC signal in the receiver coil 232. The AC signal is received by the AC-to-DC power converter 240, which converts the AC signal into a DC signal. The DC signal is then received by the load 242 (e.g., to charge the battery).

Additionally or alternatively, the transferred energy can be used to transmit communication signals between the transmitter device 202 and the receiver device 204 (communication signals represented by arrow 246). For example, the receiver device 204 may use load modulation to transfer communication signals (e.g., control and/or status data) from the receiver device 204 to the transmitter device 202. As one example, the receiver device 204 can apply a controlled pulsed load across the receiver coil 232, which results in an amplitude modulation of the voltage on the transmitter coil 226. The transmitter device 202 (e.g., or a processing device 248 in the transmitter device 202) can detect and demodulate the amplitude modulation.

Additionally or alternatively, the receiver device 204 may transfer a brief burst of energy (a "ping") to the transmitter device 202 to inform the transmitter device 202 of the presence of the receiver device 204. Additionally or alternatively, the receiver device 204 may transfer a ping to the transmitter device 202 to determine if the transmitter device 202 is ready to transmit energy.

Additionally or alternatively, the transmitter device 202 can use phase shift keying, frequency modulation and the like to transmit communication signals from the transmitter device 202 to the receiver device 204. Additionally or alternatively, the transmitter device 202 may transfer a ping to the receiver device 204 to determine if the receiver device 204 is ready to receive energy and/or to determine a location of the receiver device 204 on the transmitting surface of the transmitter device 202.

A processing device 248 in the transmitter device 202 can be connected to a signal generator 250 and/or to the shared power converter 210. Although not shown in FIG. 2, the processing device 248 may be coupled to other components (e.g., a display, memory) in the transmitter device 202. The processing device 248 may control and/or monitor the operation of the shared power converter 210 and/or the signal generator 250. As one example, when the shared power converter 210 is configured as an H Bridge, the processing device 248 may control the activation (e.g., turning on or opening) and the deactivation (e.g., turning off or closing) of the switching elements in the H Bridge.

In some embodiments, the processing device 248 can cause one or more switch signal characteristics that are stored in memory 252 to be transmitted to the signal generator 250. The one or more switch signal characteristics include, but are not limited to, a frequency, a frequency difference, a phase, a phase difference, an amplitude difference, and amplitude of a switch signal. The signal generator 250 is configured to produce switch signals based on the received switch signal characteristic(s). The processing device 248 may be configured to determine which signal converter(s) 214, 216, 218 should receive the switch signals when energy is to be transferred to one or more of the receiver devices 204, 206, 208.

The memory 252 can store electronic data that can be used by the transmitter device 202. For example, the memory 252 can store electrical data or content such as, for example, device settings and user preferences, timing and control signals, switch signals, switch signal characteristics, data structures or databases, documents and applications, identifying data for one or more receiver devices, and so on. The memory 252 can be configured as any type of memory. By way of example only, the memory 252 can be implemented as random access memory, read-only memory, Flash memory, removable memory, or other types of storage elements, or combinations of such devices.

A processing device 254 in the receiver device 204 can be coupled to the AC-to-DC power converter 240 and/or the load 242. Although not shown in FIG. 2, the processing device 254 may be connected to other components (e.g., a display, memory) in the receiver device 204. The processing device 254 may control or monitor the operation of the AC-to-DC power converter 240 and/or the load 242. As one example, the processing device 254 may monitor the charge level on the load 242 when the load 242 is a rechargeable battery.

The processing devices 248, 254 can be implemented as any electronic device capable of processing, receiving, or transmitting data or instructions. For example, the processing devices 248, 254 can each be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

Communication circuitry 256 in the transmitter device 202 may be coupled to the processing device 248 in the transmitter device 202. Similarly, communication circuitry 258 in the receiver device 204 can be coupled to the processing device 254 in the receiver device 204. The communication circuitry 256, 258 can be coupled to one another to establish a communication channel 260 between the transmitter device 202 and the receiver device 204. As described earlier, energy transfer can be used for communication between the transmitter and receiver devices 202, 204. The communication channel 260 is an additional or alternate communication mechanism that is separate from the transfer of energy. The communication channel 260 can be used to convey information from the transmitter device 202 to the receiver device 204, and vice versa. The communication channel 260 may be implemented as a wired link and/or as a wireless link. The communication channel 260 may be configured as any suitable communication channel, such as, for example, Near Field Communication, Bluetooth, and/or Infrared communication channels.

In some embodiments, the transmitter device 202 and/or the receiver device 204 may each include one or more sensors 262, 264, respectively. The sensor(s) 262 in the transmitter device 202 are coupled to the processing device 248, and the sensor(s) 264 in the receiver device 204 are coupled to the processing device 254. Each sensor in the sensors 262, 264 may be positioned substantially anywhere on or in the transmitter device 202 and/or the receiver device 204, respectively. The sensor(s) 262, 264 can be configured to sense substantially any type of characteristic, such as, but not limited to, images, pressure, light, heat, force, touch, temperature, movement, and so on. For example, the sensor(s) 262, 264 may each be an image sensor, a temperature sensor, a light or optical sensor, a touch or proximity sensor, an accelerometer, an environmental sensor, a gyroscope, a magnet, and so on.

As will be described in more detail later, one or more sensors 262 in the transmitter device 202 can be configured to detect the presence or absence of the receiver device 204 on or near the transmitting surface of the transmitter device 202. Additionally or alternatively, at least one sensor 262 may be configured to determine a location and/or an orientation of the receiver device 204 on the transmitting surface. For example, one or more proximity sensors can be used to determine whether an object is in contact with the transmitting surface, and an image and/or magnetic sensor(s) may be used to determine if the object is the receiver device 204. Additionally, an image sensor and/or one or more magnetic sensor(s) can be used to identify the receiver device 204, which allows the transmitter device 202 (e.g., the processing device 248) to determine the switch signal characteristics to transmit to the signal generator 250. Alternatively, the identity of the receiver device 204 may be used by the processing device 248 to cause particular switch signals to be transmitted to a respective signal converter 214, 216, 218.

With respect to the receiver device 204, the one or more sensors 264 in the receiver device 204 may be configured to detect or obtain data regarding the receiver device 204. For example, one or more sensors 264 can be used to determine an orientation of the receiver device 204 on the transmitting surface of the transmitter device 202. The orientation of the receiver device 204 may be horizontal (e.g., flat on the transmitting surface) or vertical (e.g., resting on a side of the housing on the transmitting surface). In some embodiments, the receiver device 204 can transmit data to the transmitter device 202 regarding the orientation of the receiver device 204.

The receiver device 206 is shown with the receiver coil 234 connected to circuitry 266 and a load 268 connected to the circuitry 266. The receiver device 208 is depicted with the receiver coil 236 connected to circuitry 270 and a load 272 connected to the circuitry 270. As described earlier, each circuitry 266, 270 and load 268, 272 can be configured similarly to the circuitry (receiver resonant circuitry 238, AC-to-DC power converter 240, communication circuitry 258, processing device 254, and/or sensor(s) 264) and load 242 shown in the receiver device 204. Alternatively, in some embodiments, at least one receiver device 206 and/or 208 can be configured with different circuitry and/or load.

Although only one shared power converter 210, processing device 248, signal generator 250, communication circuitry 256, memory 252, and sensors 262 are shown in FIG. 2, a transmitter device 202 can include multiple shared power converters, processing devices, communication circuitry, memories, sensors, and/or signal generators. Each signal converter (e.g., 214, 216, 218) in a shared power converter can be connected to a respective signal generator, transmitter resonant circuitry, and/or transmitter coil.

Similarly, in some embodiments, the receiver devices 204, 206, 208 may include multiple receiver coils, resonant circuitry, AC-to-DC power converters, loads, communication circuitry, processing devices, and/or sensors. In some embodiments, each receiver coil can be connected to a respective receiver resonant circuitry and an AC-to-DC power converter. Alternatively, two or more receiver coils may share an AC-to-DC power converter and resonant circuitry.

In some embodiments, the shared power converter 210 can be disposed in a power adapter that is coupled to the transmitter device 202. Additionally, the power adapter may include the signal generator 250, the memory 252, and a processing device. In such embodiments, the signal converters 214, 216, 218 can be configured to convert a first AC signal into a second AC signal. Each signal converter 214, 216, 218 may be coupled to a respective transmitter coil 226, 228, 230. A transmitter coil 226, 228, 230 can receive a converted second AC signal when energy is to be transferred to a respective receiver coil 232, 234, 236. For example, in one embodiment, at least one signal converter 214, 216, 218 may be configured to convert a high voltage, low frequency AC signal into a low voltage, high frequency AC signal.

Figure 3:
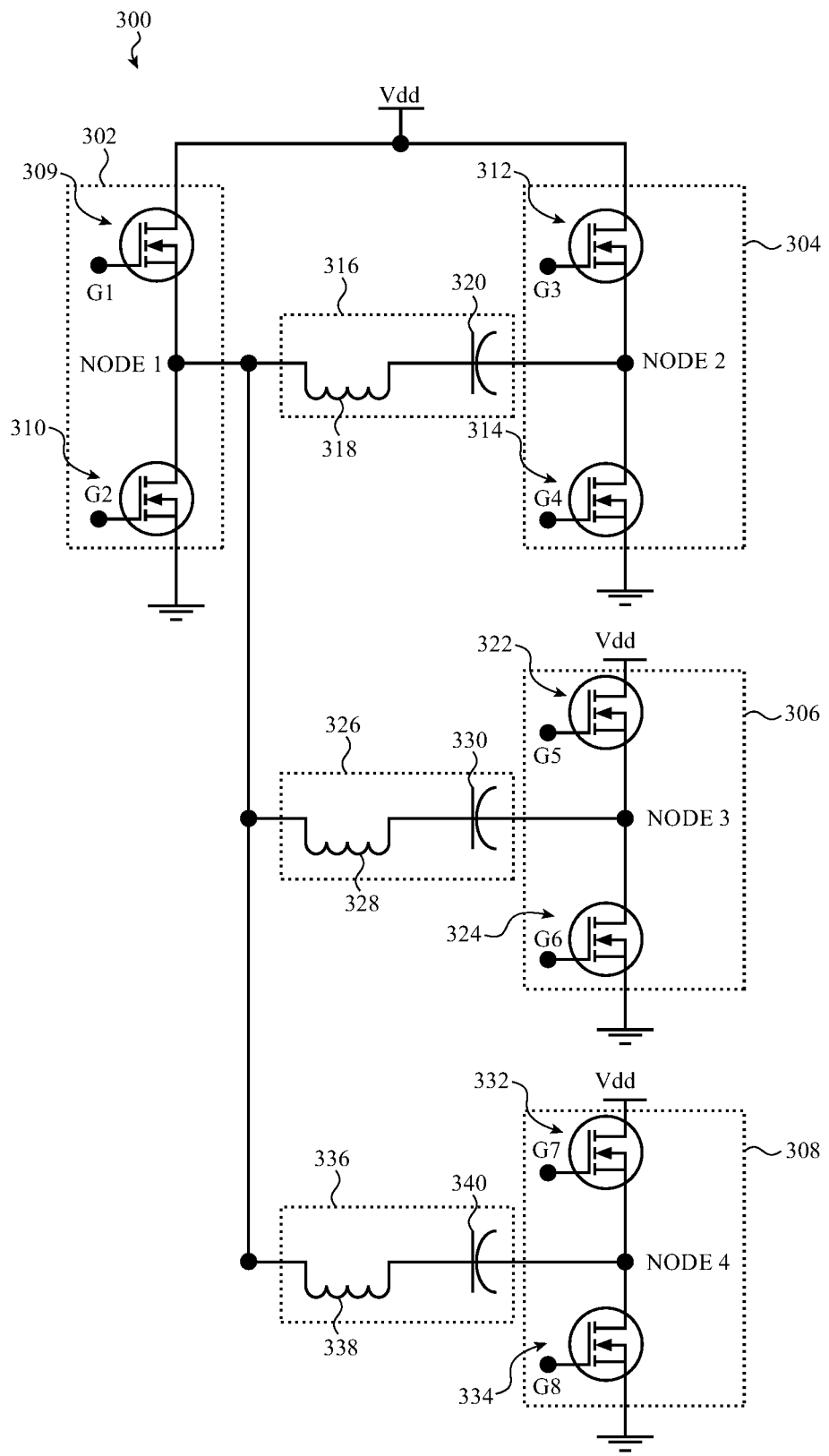
FIG. 3 depicts an example schematic diagram of a shared power converter that is suitable for use in the transmitter device shown in FIG. 1.

FIG. 3 depicts an example schematic diagram of a shared power converter that is suitable for use in the transmitter device shown in FIG. 1. The shared power converter 300 includes a leading half bridge 302 and multiple trailing half bridges 304, 306. 308. Although FIG. 3 depicts three trailing half bridges 304, 306, 308, the shared power converter can include two or more trailing half bridges. The leading half bridge 302 and the trailing half bridges 304, 306, 308 are each coupled between a first input node (e.g., a voltage source Vdd) and a second input node (e.g., a reference voltage source (e.g., ground)).

The leading half bridge 302 includes a first switching element 309 connected to a first intermediate node (NODE 1) and a second switching element 310 connected to the first intermediate node (NODE 1). The first trailing half bridge 304 includes a third switching element 312 connected to a second intermediate node (NODE 2) and a fourth switching element 314 connected to the second intermediate node (NODE 2). A first LC resonant circuit 316 is connected between the first intermediate node (NODE 1) and the second intermediate node (NODE 2). In the illustrated embodiment, the first LC resonant circuit 316 includes a first transmitter coil 318 connected in series with a first capacitor 320. The first capacitor 320 represents the transmitter resonant circuitry shown in FIG. 2 (e.g., transmitter resonant circuitry 220).

The second trailing half bridge 306 includes a fifth switching element 322 connected to a third intermediate node (NODE 3) and a sixth switching element 324 connected to the third intermediate node (NODE 3). A second LC resonant circuit 326 is connected between the first intermediate node (NODE 1) and the third intermediate node (NODE 3). As shown in FIG. 3, the second LC resonant circuit 326 includes a second transmitter coil 328 connected in series with a second capacitor 330. Like the first capacitor 320, the second capacitor 330 represents the transmitter resonant circuitry shown in FIG. 2 (e.g., transmitter resonant circuitry 222).

The third trailing half bridge 308 includes a seventh switching element 332 connected to a fourth intermediate node (NODE 4) and an eighth switching element 334 connected to the fourth intermediate node (NODE 4). A third LC resonant circuit 336 is connected between the first intermediate node (NODE 1) and the fourth intermediate node (NODE 4). In the illustrated embodiment, the third LC resonant circuit 336 includes a third transmitter coil 338 (e.g., a third load) connected in series with a third capacitor 340. The third capacitor 340 represents the transmitter resonant circuitry shown in FIG. 2 (e.g., transmitter resonant circuitry 224).

The first, second, and third LC resonant circuits 316, 326, 336 may each be configured differently in other embodiments. For example, the second capacitor 330 in the second LC resonant circuit 326 can be connected in series with the second transmitter coil 328 and another capacitor connected in parallel with the second transmitter coil 328.

Alternatively, the first, second, and third LC resonant circuits 316, 326, 336 can each be configured as a different type of resonant circuit. For example, the first resonant circuit 316 can be configured as an RLC resonant circuit. A resistor may be connected in series with the first transmitter coil 318 and a capacitor connected in parallel with the first transmitter coil 318.

In one embodiment, all of the components shown in FIG. 3 are included in a transmitter device. In another embodiment, the leading half bridge 302 and the first, second, and third trailing half bridges 304, 306, 308 are included in a power adapter that is coupled to the transmitter device and the first, second, and third LC resonant circuits 316, 326, 336 are included in the transmitter device. In yet another embodiment, the leading half bridge 302, the first, second, and third trailing half bridges 304, 306, 308, and the first, second, and third capacitors 320, 330, 340 are included in a power adapter that is coupled to the transmitter device and the first, second, and third transmitter coils 318, 328, 338 are included in the transmitter device.

In FIG. 3, each switching element 309, 310, 312, 314, 322, 324, 332, 334 is a metal-oxide-semiconductor field-effect transistor (MOSFET), although this is not required. Other embodiments can use a different type of switching element or semiconductor switch, such as a bi-polar transistor, a diode, or any other suitable electronic switch.

One or more signal generators (e.g., signal generator 250 in FIG. 2) may be coupled to respective switching elements 309, 310, 312, 314, 322, 324, 332, 334. In the illustrated embodiment, one or more signal generators can be coupled to a respective gate G1, G2, G3, G4, G5, G6, G7, and/or G8 of the switching elements 309, 310, 312, 314, 322, 324, 332, 334.

As described earlier, the switch signals are used to configure or assemble the shared power converter for wireless energy transfer. Which trailing half bridge(s) 304, 306, 308 is used to form a full bridge with the leading half bridge 302 is determined at least in part by which trailing half bridge(s) 304, 306, 308 receives switch signals. An AC coil signal is generated and applied across a respective LC resonant circuit 316, 326, 336 by alternately opening (e.g., turned off or deactivated) and closing (e.g., turned on or activated) the switching elements in the leading half bridge 302 and in the respective trailing half bridge 304, 306, 308.

Other factors or considerations can influence which trailing half bridge 304, 306, 308 is used to form a full bridge with the leading half bridge 302. For example, the location of a receiver device on the transmitting surface of a transmitter device can be considered when determining which trailing half bridge(s) 304, 306, 308 is coupled to the leading half bridge 302.

For example, with respect to the leading half bridge 302 and the first trailing half bridge 304, the first and fourth switching elements 309, 314 are closed while the second and third switching elements 310, 312 are open, and the first and fourth switching elements 309, 314 are open while the second and third switching elements 310, 312 are closed to produce an AC coil signal. In particular, the switch signals that are initially received by the first, second, third, and fourth switching elements 309, 310, 312, 314 cause the first and fourth switching elements 309, 314 to close and the second and third switching elements 310, 312 to open, which allows a signal (e.g., current) to pass from the first input node (e.g., Vdd), through the first switching element 309, through the first LC resonant circuit 316, and through the fourth switching element 314 to the second input node (e.g., ground). Thus, the signal passes through the first LC resonant circuit 316 in one direction. Thereafter, the switch signals that are received by the first, second, third, and fourth switching elements 309, 310, 312, 314 cause the first and fourth switching elements 309, 314 to open and the second and third switching elements 310, 312 to close, which permits a signal (e.g., current) to pass from the first input node, through the third switching element 312, through the first LC resonant circuit 316, and through the second switching element 310 to the second input node. Thus, the signal passes through the first LC resonant circuit in an opposite direction. In this manner, an AC coil signal is received by the first transmitter coil 318, which causes the first transmitter coil 318 to generate one or more time-varying or oscillating magnetic fields.

A similar process can be used to alternately open and close the first and sixth switching elements 309, 324 and the second and fifth switching elements 310, 322 to cause the second transmitter coil 328 to produce one or more time-varying magnetic fields. Additionally, the first and eighth switching elements 309, 334 and the second and seventh switching elements 310, 332 may be alternately opened and closed to cause the third transmitter coil 338 to generate one or more time-varying magnetic fields.

As described earlier, the switch signals can be used to modify, define, or customize the characteristics of the AC coil signal that is received by a respective transmitter coil 318, 328, 338. The characteristics of the AC coil signal include the phase, the frequency, and/or the amplitude of the AC coil signal. The AC coil signal is used to control and/or adjust the one or more time-varying magnetic fields that develop around a transmitter coil, which in turn regulates and adjusts the amount of energy transferred to a receiver coil in a receiver device.

Figure 4A:
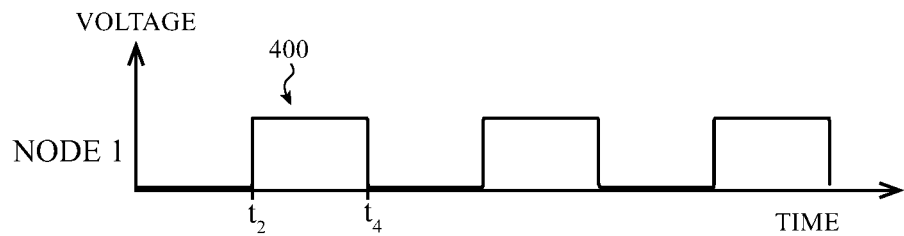
FIG. 4A shows example voltage levels of a first node signal that can be produced at the first intermediate node in the shared power converter shown in FIG. 3.
Figure 4B:
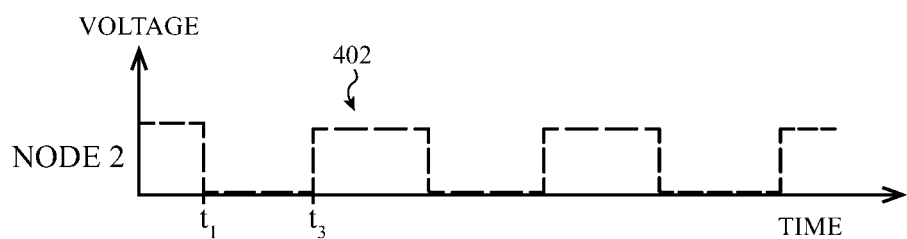
FIG. 4B depicts example voltage levels of a second node signal that can be produced at the second intermediate node in the shared power converter shown in FIG. 3.
Figure 4C:
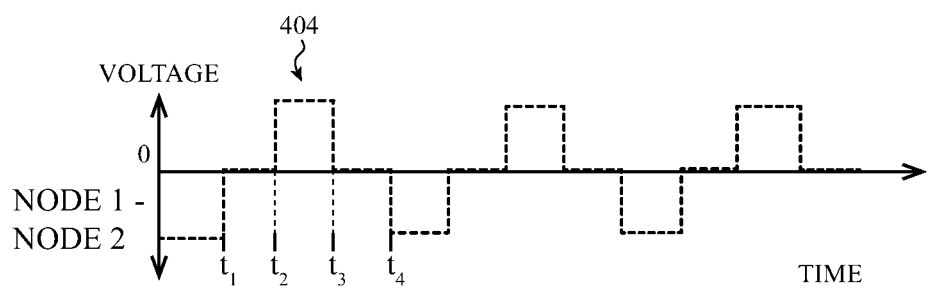
FIG. 4C illustrates example voltage levels of an AC coil signal that is received by the first transmitter coil shown in FIG. 3, and is based on the first and second node signals shown in FIGS. 4A-4B.

FIGS. 4A-4C are described in conjunction with the leading half bridge 302 and the first trailing half bridge 304 shown in FIG. 3. FIG. 4A shows example voltage levels of a first node signal that can be produced at the first intermediate node (NODE 1), while FIG. 4B depicts example voltage levels of a second node signal that can be produced at the second intermediate node (NODE 2) in the shared power converter shown in FIG. 3. FIG. 4C illustrates the voltage levels of an AC coil signal that is received by the first transmitter coil 318 shown in FIG. 3 based on the first and second node signals shown in FIGS. 4A-4B. As described earlier, the AC coil signal is used to control the transfer of energy from the first transmitter coil 318.

In a non-limiting example, a first square wave switch signal is received by the first switching element 309, a second square wave switch signal is received by the second switching element 310, a third square wave switch signal is received by the third switching element 312, and a fourth square wave switch signal is received by the fourth switching element 314. The third and fourth square wave switch signals have a phase difference or offset with respect to the phase of the first and second square wave switch signals. As described earlier, the first, second, third, and fourth square wave switch signals alternately open and close the first, second, third, and fourth switching elements 309, 310, 312, 314.

Based on the above example, the voltage levels in the first node signal 400 (see FIG. 4A) represent the voltage levels at the first intermediate node (NODE 1) and the voltage levels in the second node signal 402 (FIG. 4B) represent the voltage levels at the second intermediate node (NODE 2). The AC coil signal 404 represents the voltage levels across the first transmitter coil 318 based on the first and second node signals 400, 402 (e.g., NODE 1-NODE 2). The second node signal 402 is phase-shifted with respect to the first node signal 400 because the third and fourth square wave switch signals received by the third and fourth switching elements 312, 314 are phase-shifted with respect to the first and second square wave switch signals received by the first and second switching elements 309, 310. Due to constructive and destructive interferences between the first node signal 400 and the second node signal 402, the AC coil signal 404 includes three voltage levels that vary over time, which adjusts the one or more time-varying magnetic fields produced by the first transmitter coil 318. The amount of energy that is transferred by the first transmitter coil 318 is regulated through the variations in the AC coil signal 404.

In particular, the voltage levels of the AC coil signal 404 can be produced as follows. At time $t_1$, the voltage level of the second node signal 402 transitions from a first voltage level to a low voltage level (e.g., ground), while the voltage level of the first node signal 400 is at a low voltage level (e.g., ground). Accordingly, the voltage level of the AC coil signal 404 transitions from a negative first voltage level to a second voltage level (e.g., zero). The amount of energy transferred from the transmitter coil 318 transitions from a first quantity of energy to a second quantity of energy (e.g., zero) when the voltage level of the AC coil signal 404 transitions to the second voltage level.

At time $t_2$, the voltage level of the first node signal 400 transitions from the low voltage level to a first voltage level, while the voltage level of the second node signal 402 remains at the low voltage level. Accordingly, at time $t_2$, the voltage level of the AC coil signal 404 transitions from the second voltage level to a positive third voltage level. The amount of energy transferred from the first transmitter coil 318 can transition from the first quantity of energy to a second quantity of energy when the voltage level of the AC coil signal 404 transitions to the positive second voltage level.

At time $t_3$, the voltage level of the second node signal 402 transitions from the low voltage level to the first voltage level, while the voltage level of the first node signal 400 remains at the first voltage level. Accordingly, at time $t_3$, the voltage level of the AC coil signal 404 transitions from the positive second voltage level to the first voltage level.

At time $t_4$, the voltage level of the first node signal 400 transitions from the first voltage level to the low voltage level, while the voltage level of the second node signal 402 remains at the first voltage level. Accordingly, at time $t_4$, the voltage level of the AC coil signal 404 transitions from the second voltage level to first negative voltage level.

The transitions in the first and second node signals 400, 402 repeat over time to produce the repeating waveform of the AC coil signal 404. Based on the AC coil signal 404, the energy transferred from the first transmitter coil 318 varies over time. Thus, the amount of energy that is transferred from the transmitter coil 318 can be controlled through the different voltage levels in the AC coil signal 404 and the timing of the transitions in the voltage levels of the AC coil signal 404.

The voltage levels in the first node signal 400, the second node signal 402, and the AC coil signal 404 can each be any suitable voltage level. The voltage levels in the first node signal 400 may differ from the voltage levels in the second node signal 402. Additionally, the switch signals are not limited to square waves. A switch signal can have any suitable waveform.

Figure 5A:
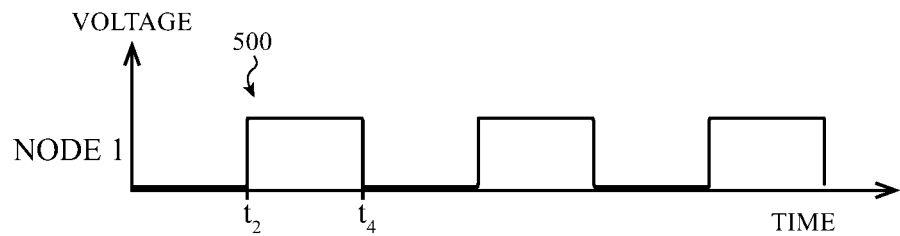
FIG. 5A shows example voltage levels of a first node signal that can be produced at the first intermediate node in the shared power converter shown in FIG. 3.
Figure 5B:
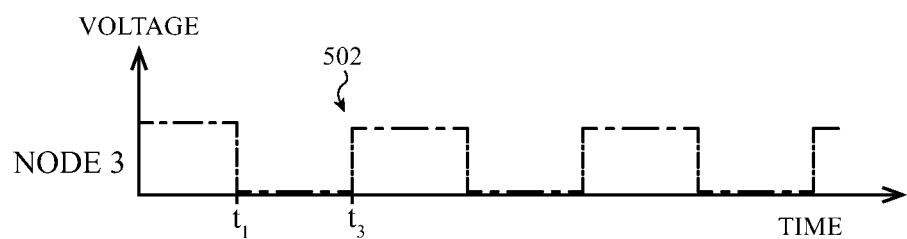
FIG. 5B depicts example voltage levels of a third node signal that can be produced at the third intermediate node in the shared power converter shown in FIG. 3.
Figure 5C:
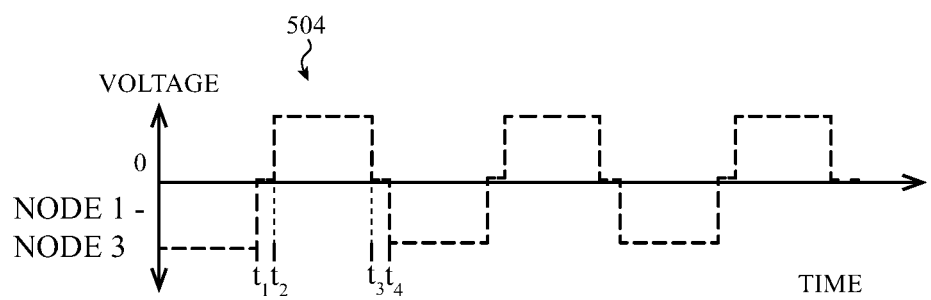
FIG. 5C depicts example voltage levels of an AC coil signal that is received by the second transmitter coil shown in FIG. 3, and is based on the first and third node signals shown in FIGS. 5A-5B.

FIGS. 5A-5C are described in conjunction with the leading half bridge 302 and the second trailing half bridge 306 shown in FIG. 3. FIG. 5A shows example voltage levels of a first node signal that can be produced at the first intermediate node (NODE 1), and FIG. 5B depicts example voltage levels of a third node signal that can be produced at the third intermediate node (NODE 3) in the shared power converter shown in FIG. 3. FIG. 5C illustrates the voltage levels of an AC coil signal that is received by the second transmitter coil 328 shown in FIG. 3 based on the first and second node signals shown in FIGS. 5A-5B.

In a non-limiting example, a first square wave switch signal is received by the first switching element 309, a second square wave switch signal is received by the second switching element 310, a fifth square wave switch signal is received by the fifth switching element 322, and a sixth square wave switch signal is received by the sixth switching element 324. The fifth and sixth square wave switch signals received by the fifth and sixth switching elements 322, 324 in the second trailing half bridge 306 are phase-shifted with respect to the first and second square wave switch signals that are received by the first and second switching elements 309, 310 in the leading half bridge 302. As described earlier, the first, second, fifth, and sixth square wave switch signals alternately open and close the first, second, fifth, and sixth switching elements 309, 310, 322, 324.

The voltage levels produced in first node signal 500 represent the voltage levels at the first intermediate node (NODE 1) and the voltage levels in the third node signal 502 represent the voltage levels at the third intermediate node (NODE 3). The third node signal 502 is phase-shifted with respect to the first node signal 500 because the fifth and sixth square wave switch signals received by the fifth and sixth switching elements 322, 324 are phase-shifted with respect to the first and second square wave switch signals received by the first and second switching elements 309, 310.

The AC coil signal 504 represents the voltage levels across the second transmitter coil 328 based on the first and third node signals 500, 502 (e.g., NODE 1-NODE 3). Due to constructive and destructive interferences between the first node signal 500 and the third node signal 502, the AC coil signal 504 includes three voltage levels that vary over time, which adjusts the one or more time-varying magnetic fields produced by the second transmitter coil 328. The amount of energy that is transferred by the second transmitter coil 328 is controlled through the variations in the AC coil signal 504.

In the illustrated embodiment, the voltage levels and the transitions between the voltage levels in the first node signal 500 are similar to the voltage levels and the transitions between the voltage levels in the first node signal 400 shown in FIG. 4. The voltage levels in the third node signal 502 are similar to the voltage levels in the second node signal 402 (see FIG. 4B), but the transitions between the voltage levels in the third node signal 502 occur later in time compared to voltage levels in the second node signal 402. In other words, the transitions between the voltage levels in the third node signal 502 occur after the transitions between the voltage levels in the second node signal 402.

Accordingly, the amount of time the AC coil signal 504 is at the negative first voltage level is greater than the amount of time the AC coil signal 404 (FIG. 4B) is at the negative first voltage level. The amount of time the AC coil signal 504 (see FIG. 5C) is at the second voltage level (e.g., zero) is less than the amount of time the AC coil signal 404 is at the second voltage level. Finally, the amount of time the AC coil signal 504 is at the positive third voltage level is greater than the amount of time the AC coil signal 404 (FIG. 4B) is at the positive third voltage level. Thus, the time spent transferring energy by the second transmitter coil 328 is greater than the time spent transferring energy by the transmitter coil 318.

The amount of energy transferred by a transmitter coil can be regulated by phase-shifting the switch signals that are received by a trailing half bridge with respect to the switch signals received by the leading half bridge. In the embodiment shown in FIGS. 4 and 5, the switch signals received by the trailing half bridges 304, 306 can be phase-shifted by a different amount of time, thereby allowing the amount of energy transferred by the first and second transmitter coils 318, 328 to be customized for particular receiver devices. For example, one receiver device may be configured to receive a greater amount of energy for a longer time period than another receiver device.

The voltage levels in the first node signal 500, the third node signal 502, and the AC coil signal 504 can each be any suitable voltage level. The voltage levels in the first node signal 500 may differ from the voltage levels in the third node signal 502. Additionally, the switch signals are not limited to square waves. A switch signal can have any suitable waveform.

Those skilled in the art will recognize that when the resonant circuitry in a transmitter device (e.g., transmitter resonant circuitry 220 in FIG. 2) and the resonant circuitry in a receiver device (e.g., receiver resonant circuitry 238) are tuned to resonant at a common frequency, the current received by a transmitter coil will be a sine wave waveform. The voltage waveform (e.g., AC coil signal 404 or 504) output to the transmitter coil does not significantly change the current waveform.

Figure 6:
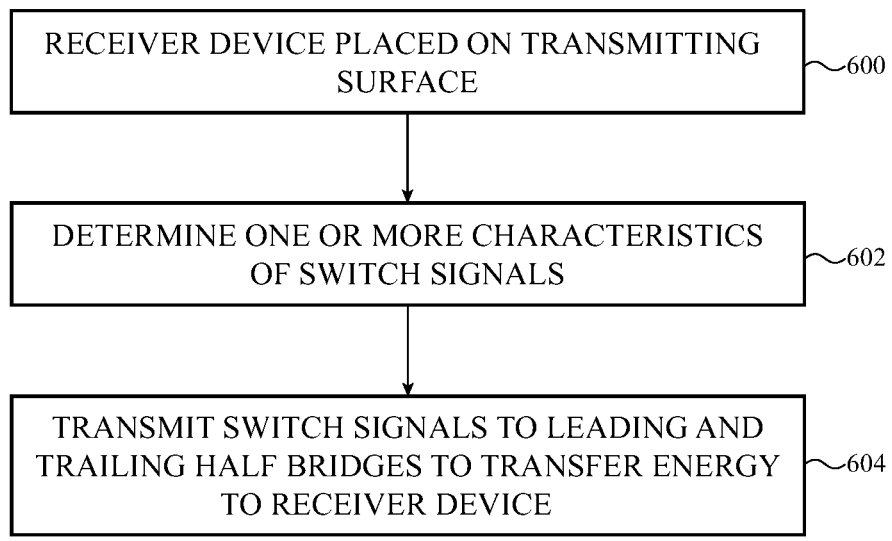
FIG. 6 shows a flowchart of a first method of operating a wireless transmitter device that includes or is coupled to a shared power converter.

FIG. 6 depicts a flowchart of a first method of operating a wireless transmitter device that is coupled to, or includes, a shared power converter. Initially, as shown in block 600, a receiver device is placed on a transmitting surface of a transmitter device. One or more switch signal characteristics are then determined at block 602. As described earlier, the switch signals characteristic(s) include a phase (or phase difference), an amplitude or amplitude difference, and/or a frequency (or frequency difference) of at least one set of switch signals (e.g., the switch signals received by a trailing half bridge). For example, to customize or regulate the transfer of energy, the switch signals received by the switching elements in a trailing half bridge can be phase-shifted with respect to the switch signals received by the switching elements in the leading half bridge. Additionally, in some embodiments, the amplitude and/or frequency of the switch signals received by a trailing half bridge can differ from the switch signals received by a leading half bridge.

The switch signal characteristic(s) can be determined based at least in part on the characteristics of a respective transmitter coil (e.g., number of windings, DC resistance, maximum DC signal, the electromagnetic interference, magnetic saturation flux density, Curie temperature, and the like). Additionally or alternatively, the one or more switch signal characteristics can be determined based at least in part on the characteristics of the receiver coil in the receiver device and/or the energy transfer specifications for the receiver device.

Next, as shown in block 604, the switch signals are transmitted to the switching elements in the leading half bridge and the switch signals are transmitted to the switching elements in a particular one of the trailing half bridges. Together the leading half bridge and the trailing half bridge form a full bridge, allowing energy to be transferred to the receiver device.

Figure 7:
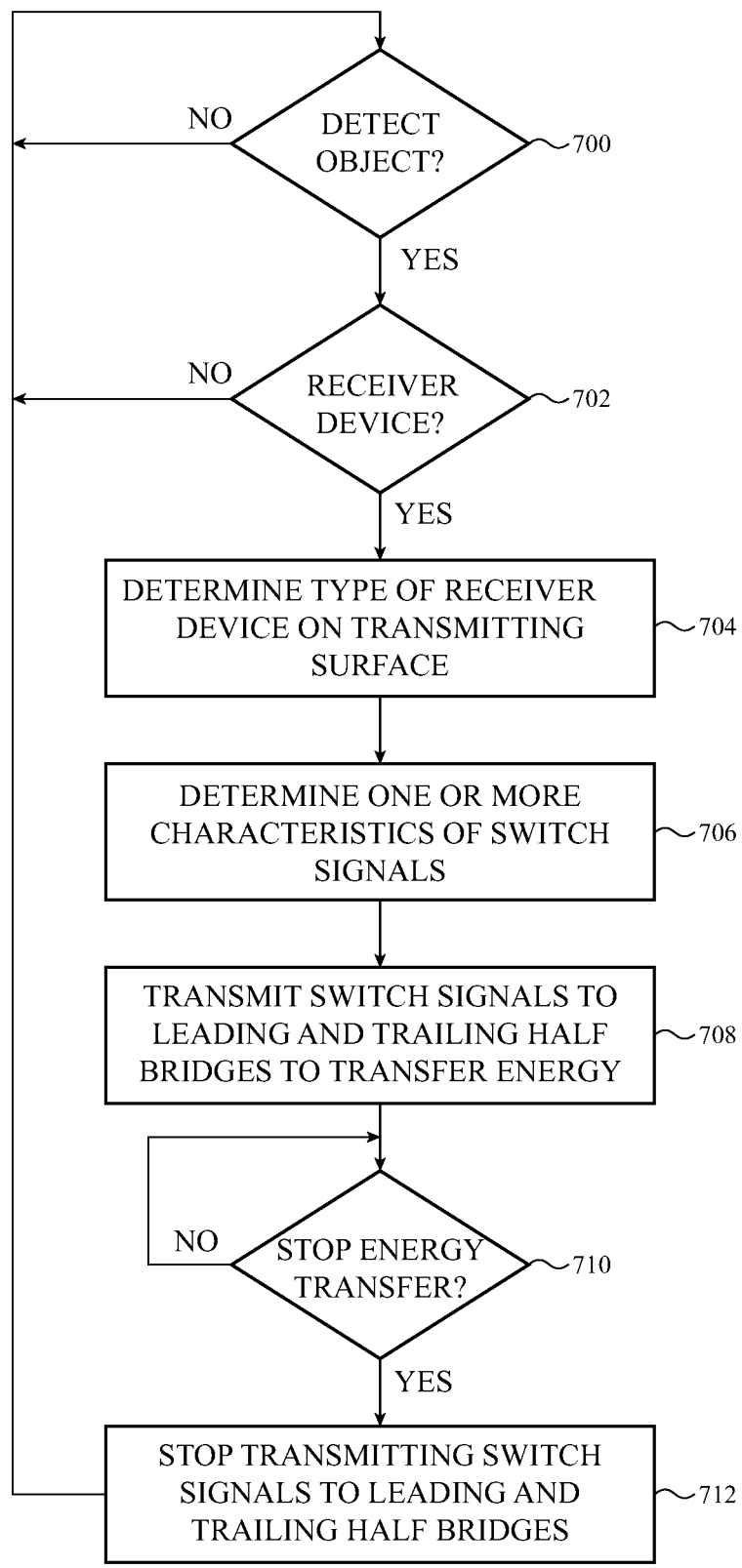
FIG. 7 depicts a flowchart of a second method of operating a wireless transmitter device that includes or is coupled to a shared power converter.

FIG. 7 depicts a flowchart of a second method of operating a wireless transmitter device that is coupled to, or includes, a shared power converter. Initially, as shown in block 700, a determination is made as to whether an object is detected on a transmitting surface of a transmitter device. The presence of the object may be determined using a variety of methods. In one embodiment, one or more sensors in the transmitter device (e.g., sensors 262 in FIG. 2) can be used to detect the presence of an object on the transmitting surface. For example, a processing device (e.g., processing device 248 in FIG. 2) can receive output signals from one or more proximity sensors. The processing device may be configured to process or analyze the signals to determine whether an object is in contact with the transmitting surface.

Additionally or alternatively, light sensors may be used to detect the presence of an object. In such embodiments, a transmitting surface can include apertures or openings that allow light to be received by light sensors within the transmitter device. When an object is placed on the transmitting surface, the object can block one or more openings and prevent a light sensor (or sensors) from receiving light. A processing device can receive output signals from the light sensors that represent the amount of detected light. The processing device may be configured to process the output signals and, based on the output signals from the blocked light sensor(s) indicating an absence of light, determine an object is in contact with the transmitting surface.

Additionally or alternatively, an image sensor can capture images of the transmitting surface. A processing device may be configured to analyze the images to determine when an object is near or in contact with the transmitting surface of the transmitter device.

Returning to block 700, the process waits at block 700 when it is determined an object is not in contact with the transmitting surface. When it is determined an object is in contact with the transmitting surface, the method passes to block 702 where a determination is made as to whether the object is a receiver device. Any suitable technique can be used to determine if the object is a receiver device. For example, in one embodiment, both the receiver device and the transmitter device can include one or more conductive electrodes. At least one conductive electrode in the receiver device may be positioned over a corresponding conductive electrode (or electrodes) in the transmitter device to form one or more capacitive sensors. The capacitance of each capacitive sensor can be detected by the transmitter device (e.g., by the processing device 248) and used to determine the object is a receiver device.

Additionally or alternatively, the transmitter device may transfer a first ping (e.g., a short burst of energy) to the receiver device and the receiver device can transmit a second ping to the transmitter device in response to the received first ping. Additionally or alternatively, a communication channel (e.g., communication channel 260 in FIG. 2) can be established between the transmitter and receiver devices. A communication signal that is transmitted from the receiver device to the transmitter device can be used to determine the object is a receiver device.

The process returns to block 700 if it is determined an object is not a receiver device. When it is determined the object is a receiver device, the method passes to block 704 where the type of receiver device is determined. For example, one receiver device type can be a cellular phone and another receiver device type may be a watch. In some embodiments, the receiver device type can specify a make or model of a receiver device.

In some embodiments, the receiver device can self-identify to the transmitter device. For example, in the example provided above where one or more conductive electrodes in the receiver device are positioned over corresponding conductive electrodes in the transmitter device, the location(s) of the capacitive sensor(s) can be used to identify the receiver device type. Different types of receiver devices and/or different models of receiver devices can position the conductive electrodes at different locations within the receiver device so a particular pattern of capacitive sensors is formed when a receiver device is placed on the transmitting surface.

In some embodiments, a communication channel (e.g., communication channel 260 in FIG. 2) can be established between the transmitter and receiver devices. A receiver device can transmit one or more communication signals to the transmitter device to inform the transmitter device of the receiver device type.

Additionally or alternatively, one or more sensors in the transmitter device can be used to determine the receiver device type. For example, images of the receiver device that are captured by an image sensor can be analyzed by a processing device to determine the receiver device type. In some embodiments, a surface of the housing of a receiver device may include a pattern (e.g., a bar code or graphic) and an image of the pattern can be captured by an image sensor. A processing device can analyze the image to determine a receiver device type.

In some embodiments, one or more magnetic sensors in the transmitter device can detect a particular pattern of magnetic structures in the receiver device, where the pattern identifies the receiver device type.

After the receiver device type is determined at block 704, the method continues at block 706 where one or more switch signal characteristics are determined based on the receiver device type. Next, as shown in block 708, the switch signals are transmitted to the switching elements in the leading half bridge and the switch signals are transmitted to the switching elements in a particular one of the trailing half bridges. Together the leading half bridge and the trailing half bridge form a full bridge, allowing energy to be transferred to the receiver device.

A determination may be made at block 710 as to whether the transfer of energy is to continue or stop. For example, a processing device in the receiver device (e.g., processing device 254) may monitor the charge level on a rechargeable battery. When the battery is charged to a sufficient level (e.g., full charge level), the processing device can cause a communication signal to be transmitted to the transmitter device instructing the transmitter device to stop transferring energy. The communication signal can be transmitted through a communication channel (e.g., communication channel 260 in FIG. 2), through load modulation, and/or by causing the receiver device to transfer a ping to the transmitter device.

The method waits at block 710 when the transfer of energy is to continue. When the transfer of energy is to stop, the process passes to block 712 where the transmission of the switch signals to the leading and trailing half bridges ceases, which in turn ends the transfer of energy. The method then returns to block 700.

In some embodiments, a transmitter device can include multiple shared power converters. For example, a large charging mat can include multiple shared power converters. Rather than energizing the entire transmitting surface to transfer energy to a receiver device, only a section of the transmitting surface can be used to transfer energy to a receiver device. Accordingly, only the transmitter coil(s) in the section receive AC coil signal(s). This can reduce the amount of power consumed by a transmitter device.

Figure 8:
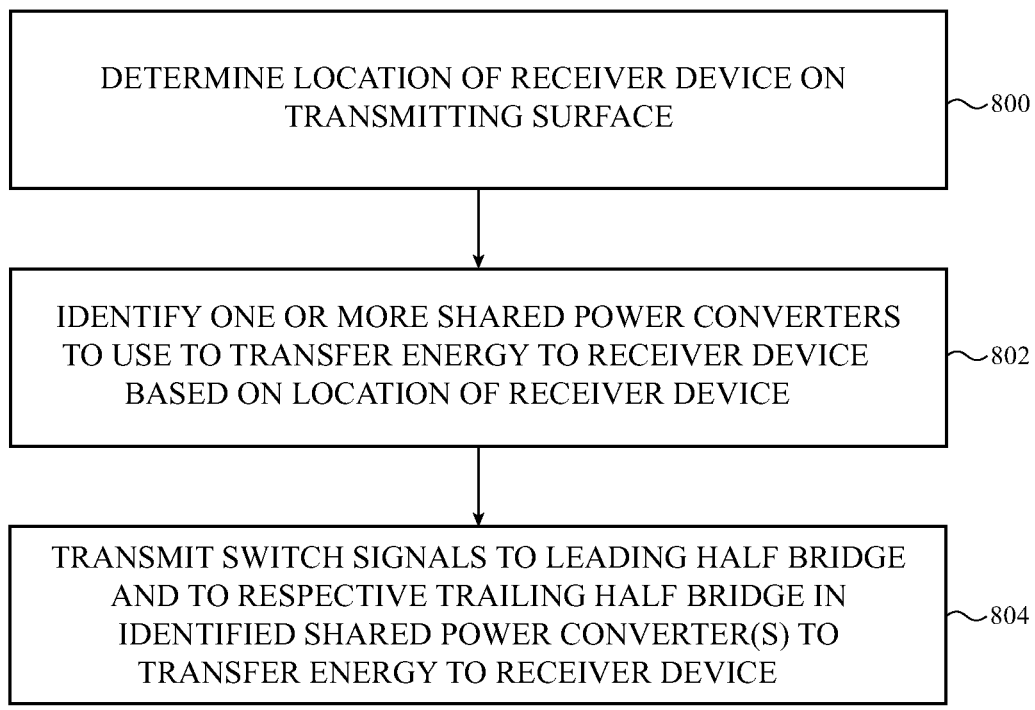
FIG. 8 shows a flowchart of a method of operating a wireless transmitter device that includes or is coupled to multiple shared power converters.

FIG. 8 shows a flowchart of a method of operating a wireless transmitter device that is coupled to or includes multiple shared power converters. Initially, as shown in block 800, the location of a receiver device can be determined. Any suitable technique can be used to determine the location of a receiver device. For example, in one embodiment, a transmitter device can include a touch-sensitive layer below the transmitting surface. The touch-sensitive layer is configured to detect multiple touch or contact events and the locations of the touch events. In a non-limiting example, a touch-sensitive layer is a capacitive touch-sensitive layer that is coupled to a processing device. Based on output signals that represent capacitance values, a processing device can determine both touch events and the locations of the touch events.

Additionally or alternatively, a processing device in the receiver device can cause the receiver device to transmit a ping to the transmitter device that indicates the location of the receiver device on the transmitting surface.

In some embodiments, one or more magnetic sensors in the transmitter device can detect a magnetic structure (or structures) in the receiver device, which can be used to determine the location of the receiver device on the transmitting surface.

Once the location of the receiver device on the transmitting surface is determined, one or more shared power converters that can be used to transfer energy to the receiver device are identified (block 802). Switch signals are then transmitted to the leading half bridge and a respective trailing half bridge in each identified shared power converter to transfer energy to the receiver device (block 804).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A shared power converter circuit for a wireless energy transfer system, the shared power converter circuit comprising:
   a leading half bridge;
   a first trailing half bridge;
   a first transmitter coil coupled between the leading half bridge and the first trailing half bridge;
   a second trailing half bridge;
   a second transmitter coil coupled between the leading half bridge and the second trailing half bridge; and
   a processor configured to:
      apply a first set of switch signals to the leading half bridge;
      apply a second set of switch signals to the first trailing half bridge, the second set of switch signals phase-shifted from the first set of switch signals; and
      apply a third set of switch signals to the second trailing half bridge, the third set of switch signals phase-shifted from the first set of switch signals.

2. The shared power converter circuit of claim 1, wherein:
   the first set of switch signals and the second set of switch signals have a first phase difference; and
   the first set of switch signals and the third set of switch signals have a second phase difference different from the first phase difference.

3. The shared power converter circuit of claim 2, wherein:
   a sensor detects a first receiver device coupled to the first transmitter coil;
   the first phase difference results in a first amount of energy being transferred from the first transmitter coil to the first receiver device;
   the sensor detects a second receiver device coupled to the second transmitter coil; and
   the second phase difference results in a second amount of energy being transferred from the second transmitter coil to the second receiver device.

4. The shared power converter circuit of claim 3, wherein the first amount of energy transferred to the first receiver device is transferred concurrently with the second amount of energy transferred to the second receiver device.

5. The shared power converter circuit of claim 1, wherein:
   the second set of switch signals are phase-shifted from the first set of switch signals by a first time; and
   the third set of switch signals are phase-shifted from the first set of switch signals by a second time different from the first time.

6. The shared power converter circuit of claim 1, wherein:
   the second set of switch signals are phase-shifted from the first set of switch signals based on characteristics of a first receiver device coupled to the first transmitter coil; and
   the third set of switch signals are phase-shifted from the first set of switch signals based on characteristics of a second receiver device coupled to the second transmitter coil.

7. The shared power converter circuit of claim 1, further comprising:
   a third trailing half bridge; and
   a third transmitter coil coupled between the leading half bridge and the third trailing half bridge, wherein the processor is further configured to apply a fourth set of switch signals to the third trailing half bridge, the fourth set of switch signals phase-shifted from the first set of switch signals.

8. A method of operating a wireless transmitter device that is coupled to or includes a shared power converter comprising a leading half bridge and multiple trailing half bridges, the method comprising:
   detecting a first receiver device on a transmitting surface of the wireless transmitter device;
   forming a first full bridge in the shared power converter to transfer a first amount of energy from a first transmitter coil to the first receiver device;
   detecting a second receiver device on the transmitting surface of the wireless transmitter device; and
   forming a second full bridge in the shared power converter to transfer a second amount of energy from a second transmitter coil to the second receiver device, the second amount of energy different from the first amount of energy.

9. The method of claim 8, wherein:
   forming the first full bridge comprises:
      applying a first set of switch signals to the leading half bridge; and
      applying a second set of switch signals to a first trailing half bridge that is coupled to the first transmitter coil, the second set of switch signals phase-shifted from the first set of switch signals; and
   forming the second full bridge comprises:
      applying the first set of switch signals to the leading half bridge; and
      applying a third set of switch signals to a second trailing half bridge that is coupled to the second transmitter coil, the third set of switch signals phase-shifted from the first set of switch signals.

10. The method of claim 9, wherein:
    the second set of switch signals are phase-shifted from the first set of switch signals by a first time; and the third set of switch signals are phase-shifted from the first set of switch signals by a second time, the second time different from the first time.

11. The method of claim 8, wherein the first amount of energy and the second amount of energy are transferred to the first receiver device and the second receiver device, respectively, simultaneously.

12. The method of claim 8, wherein the first full bridge and the second full bridge are formed simultaneously.

13. The method of claim 8, further comprising:
   detecting a third receiver device on the transmitting surface of the wireless transmitter device; and
   forming a third full bridge in the shared power converter to transfer a third amount of energy from a third transmitter coil to the third receiver device, the third amount of energy different from the first amount of energy and the second amount of energy.

14. The method of claim 13, wherein the first amount of energy, the second amount of energy, and the third amount of energy are transferred to the first receiver device, the second receiver device, and the third receiver device, respectively, simultaneously.

* * * * *